United States Patent [19]

Capuano et al.

[11] Patent Number: 5,576,115
[45] Date of Patent: Nov. 19, 1996

[54] COMPOSITE POLYMERIC ELECTROLYTE

[75] Inventors: Federico Capuano; Fausto Croce; Bruno Scrosati, all of Rome, Italy

[73] Assignee: Ente per le Nuove Tecnologie, L'Energia e L'Ambiente (ENEA), Rome, Italy

[21] Appl. No.: 424,565

[22] Filed: Apr. 17, 1995

Related U.S. Application Data

[63] Continuation of Ser. No. 2,879, Jan. 14, 1993, abandoned.

[30] Foreign Application Priority Data

Jan. 17, 1992 [IT] Italy .................................. RM92A0036

[51] Int. Cl.$^6$ ...................................................... H01M 8/10
[52] U.S. Cl. ........................ 252/62.2; 204/296; 429/191; 429/192; 429/33
[58] Field of Search ............................... 429/30, 33, 191, 429/192; 204/296; 252/62.2

[56] References Cited

U.S. PATENT DOCUMENTS 5,188,783  2/1993  Pierce ....................................... 264/104

FOREIGN PATENT DOCUMENTS 0379372  7/1990  European Pat. Off. .
2030351  4/1980  United Kingdom .

OTHER PUBLICATIONS

Solid State Ionics, vol. 36, No. 3/4, Nov. 1989, Amsterdam NL pp. 255–257, W. Wieczorek et al "Modifications of Crystalline Structure of PEO Polymer Electrolytes with Ceramic Additives" *Entire Document*.

Patent Abstracts of Japan, vol. 11, No. 117 (E–498) 11 Apr. 1987, & JP–A–61 264 679 (Matsushita *Abstract*.

Patent Abstracts of Japan, vol. 5, No. 173 (P–87) Nov. 1981 & JP–A–56 102 830 (NEC) *Abstract*.

Chemical Abstracts, vol. 113, No. 2, 1989, Columbus, Ohio, US; Abstract No. 7841k, Fengliang Lin et al "Ion Conductive Silicate–Containing Plastic Membrances" *Abstract & CN–A–1 034 212 (Chinese Scientific and Technological University) no month available.

Journal of Power Sources. vol. 32, No. 4, 1990, Lausanne Ch, pp. 381–388, F. Croce et al "The Lithium Polymer Electrolyte Battery IV. Use of Composite Electrolytes" Entire Document no month available.

Solid State Ionics, vol. 40/41, No. 1, Aug. 1990, Amsterdam, NL, pp. 375–379, F. Croce et al "Properties and Applications of Lithium Ion–Conducting Polymers" Entire Document.

Solid State Ionics, vol. 7, No. 1, Aug. 1982, Amsterdam NL, pp. 75–79 J. E. Weston et al "Effects of Inert Fillers on the Mechanical and Electrochemical Properties of Lithium Salt–Poly (Ethylene Oxide) Polymer Electrolytes" Entire Document.

Solid State Ionics, vol. 28–30, No. II, Sep., 1988, Amsterdam NL, pp. 979–982, J. Plocharski et al "PEO Based Composite Solid Electrolyte Containing Nasicon" Entire Document.

*Primary Examiner*—Kathryn Gorgos
*Attorney, Agent, or Firm*—Watson Cole Stevens Davis, P.L.L.C.

[57] ABSTRACT

Composite, ternary, polymeric system formed by intimately mixing a polymeric compound, a metal salt, and a ceramic additive acting both as agent promoting the transport features (conductivity and ion mobility) and as stabilizer of the chemical characteristics (compatibility with the electrode materials) of the polymeric electrolyte.

2 Claims, 3 Drawing Sheets

COMPOSITE POLYMERIC ELECTROLYTE

This application is a Continuation of application Ser. No. 08/002,879, filed Jan. 14, 1993, now abandoned.

BACKGROUND OF THE INVENTION

The present invention relates to a composite polymeric electrolyte, in particular for use in light-weight electrochemical accumulators.

At the present state of art, the use of complex compounds formed of polymeric components, e.g. lithium salts, such as electrolytic membranes for manufacturing electrochemical thin-layer devices (for example accumulators or optical detectors) is known. The use of such complex compounds is, however, limited in part by the operating temperature generally higher than 80° C. and by chemical reaction to the used electrode materials, in particular to lithium. The high temperature is bound to the transport mechanism which requires a polymeric structure having an amorphous state to a certain extent which is reached only above 80° C. in the known systems.

The reactivity to the electrode materials is bound to the presence of impurities (for example, water and/or solvents having low boiling points) which can hardly be eliminated by means of simple purification systems. It is then very important to find alternate materials leading to an increase of the electrical conductivity and thermal stability of the polymeric electrolytes.

SUMMARY OF THE INVENTION

According to the invention, there is provided a modification of the known systems by the addition of ceramic dust (preferably crystal zeolites, usually referred to as "molecular sieves" whose general formula is $Me_{x/n}(AlO_2)_x(SiO_2)_y \cdot xH_2O$, where Me=K, Ns, Ca, and x, y and n are integers). If such sieves have suitable dimensions and concentrations (for example, type A4), they promote the formation of amorphous phases (thus increasing the conductivity at low temperatures) and the compounding of impurities which are then separated from the electrolyte, thus increasing the stability to the electrode materials.

The composite, ternary polymeric electrolyte according to the invention is prepared by dispersing into a solution of a suitable solvent (for example acetonitrile) the three components, i.e. the polymeric component (e.g. polyethylene oxide (oxide)), the metal salt component (e.g. lithium perchlorate) and the ceramic additive (e.g. molecular sieves) in suitable proportions, for example according to the weight ratio of 10:20:70 referred to ceramic additive/polymer/salt. The dispersion is homogenized, concentrated and poured onto a substrate of inert material, for example plastic material. The solvent is then further evaporated until a self-sustaining membrane is formed.

BRIEF DESCRIPTION OF THE DRAWINGS

The addition of a ceramic additive causes three essential improvements over the known compositions, i.e. the electrolytes formed only by the combination of the polymeric component and the metal salt. Such improvements forming the characterizing part of the present invention are shown in the accompanying drawings and disclosed in the following description.

In the drawings.

DESCRIPTION OF THE PREFERRED EMBODIMENT

The improvements achieved by the composite electrolyte of the present invention are as follows.

Figure 1:
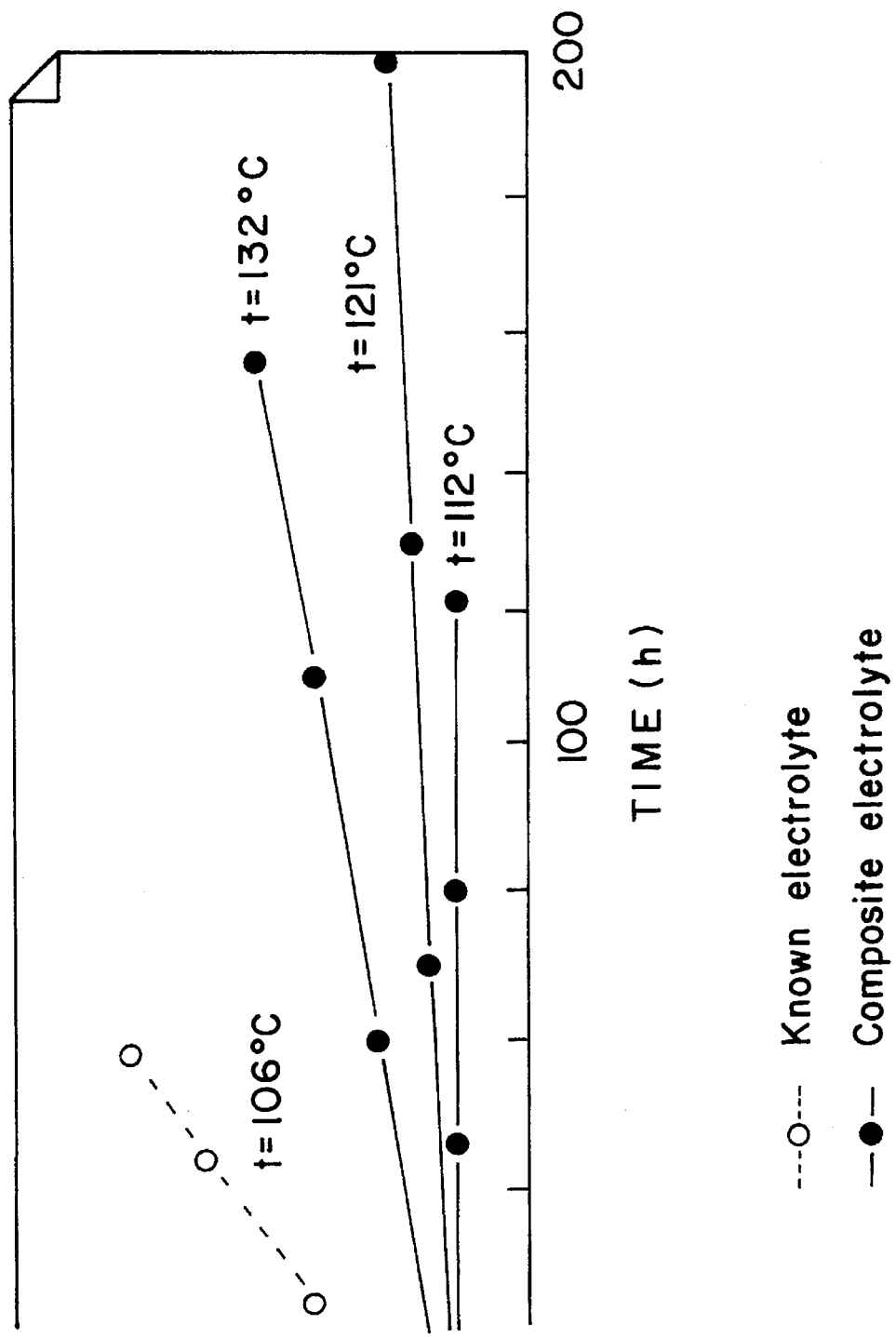
FIG. 1 is a diagram of the mechanical stability of the composite electrolyte according to the invention and that of a known electrolyte.

A) Increase in the mechanical characteristics. The dispersion of the ceramic additive leads to the development of a solid matrix which enhances as a whole the mechanical stability of the electrolyte. This effect is experimentally proved by the diagram of FIG. 1 showing a comparison between the stability in the time of the resistance of the composite electrolyte according to the invention and that of a known electrolyte. The measurement has been carried out by means of cells under pressure and then the reduction in the resistance indicates a reduction in the distance between the electrodes, which is to be referred to the fluidity of the electrolytic material.

From FIG. 1 of the annexed drawing, it is evident that the mechanical stability of the composite electrolyte is greater than that of the known electrolyte. Such a feature makes the composite electrolyte capable of being easily shaped, and then, it is preferably used for devices of practical application.

Figure 2:
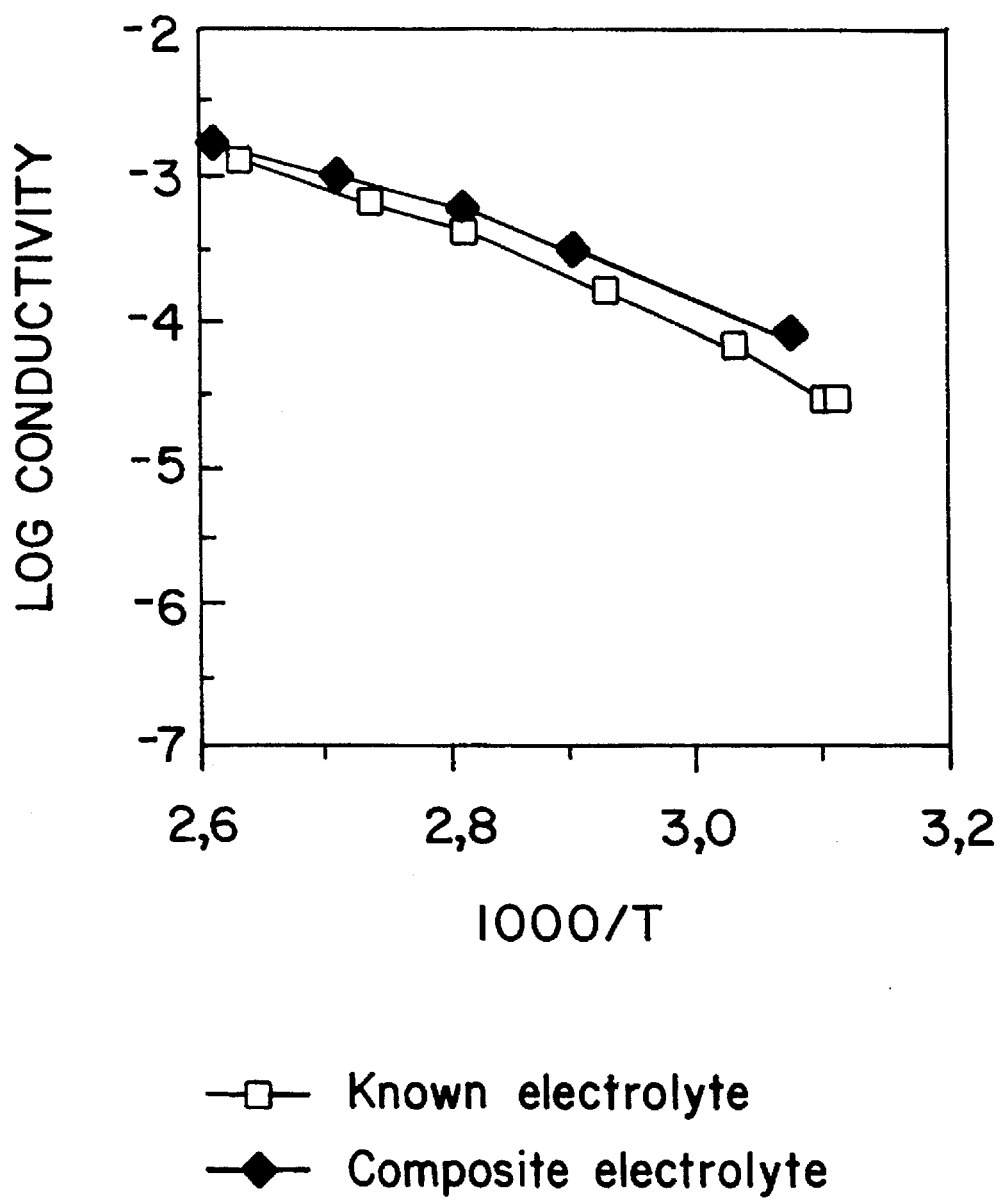
FIG. 2 is a diagram of the conductivity of the composite electrolyte according to the invention and that of a known electrolyte.

B) Increase in the conductivity. The presence of the additive in the form of particles of small diameter dispersed in the system inhibits the crystallization of the chains of the polymeric component and promotes the formation of an amorphous structure, which is essential for assuring a fast ion mobility. Such an improvement, which is of basic importance for the technological applications as it allows low temperatures to be applied, is proved in FIG. 2 in which the conductivity of the composite electrolyte according to the invention and that of the known electrolyte are compared.

Figure 3:
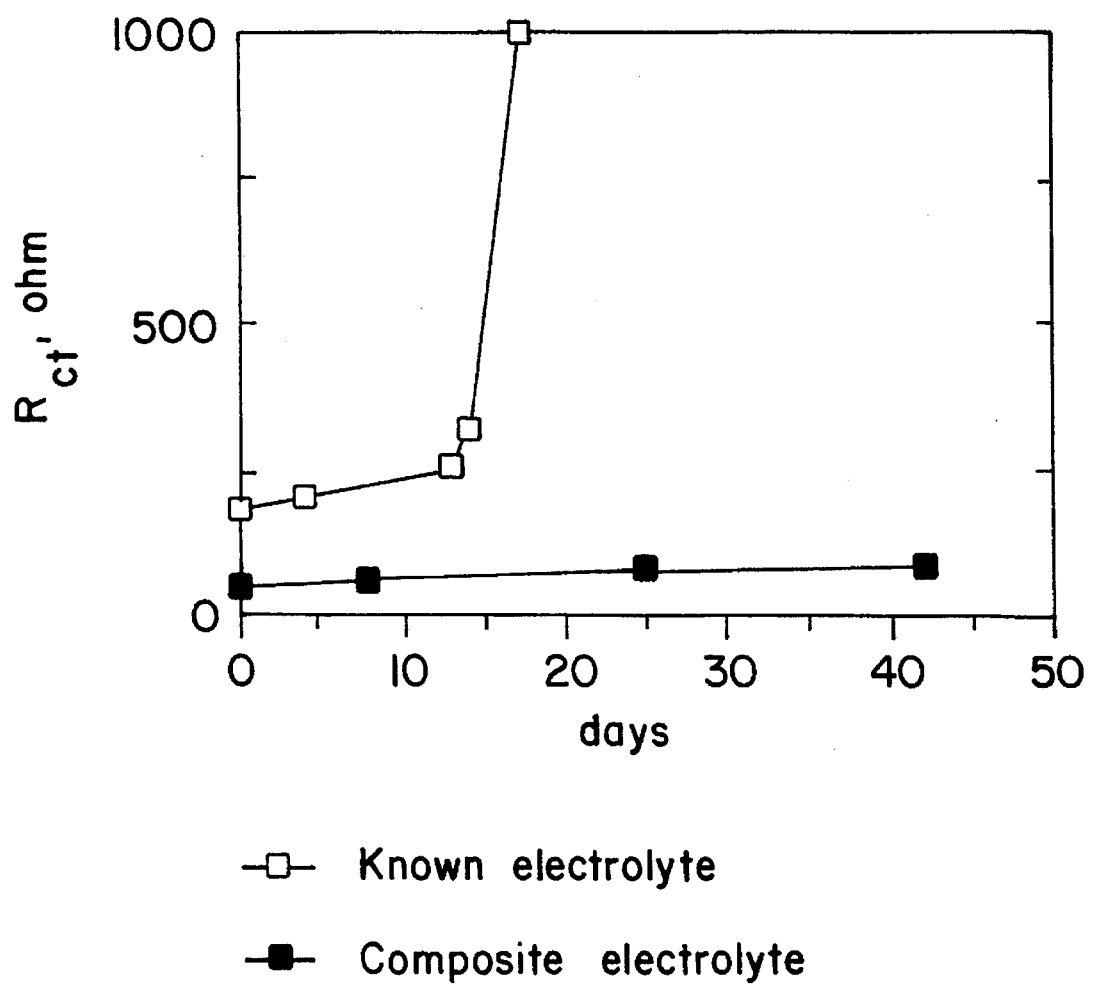
FIG. 3 is a diagram of the impedances of lithium cells based upon the composite electrolyte according to the invention and the known electrolyte.

C) Increase in the chemical stability. The ceramic additive entraps the traces of water impurities, thus taking them away from the electrolyte, by virtue of the well-known hydrophile characteristics. As the impurities are responsible for the etching of the electrode materials, and in particular, the metal lithium, their removal gives the composite electrolyte a greater inertia over the conventional electrolyte. This is proved in FIG. 3 which compares the impedances of symmetrical lithium cells based upon both of the above-mentioned electrolytes. It is seen in the figure that the resistance of the interface electrode/electrolyte designated by Rct increases, with time for cells with conventional electrolyte but remains substantially constant with respect to cells with the composite electrolytes.

The results prove that in the first case, there is a progressive etching to lithium causing a growth of a passivating layer on the surface thereof; while in the second case, the condition of the interphase remains nearly constant. As the electrodic passivation leads to a decay of the cell performance, its elimination is a substantial improvement and assures the development of devices exhibiting a long useful life.

The present invention is described with reference to a preferred embodiment thereof, however, it should be understood that modifications can be made by those skilled in the art without departing from the scope of the present invention.

We claim:

1. A composite ternary polymer electrolyte consisting of polyethylene oxide, lithium perchlorate and a zeolite which are respectively present in a weight ratio of 20:70:10.

2. The electrolyte of claim 1, wherein the zeolite is in the form of particles dispersed in the system to inhibit crystallization of the polyethylene oxide and to permit use thereof at low temperatures.